(12) United States Patent
Chen

(10) Patent No.: US 6,227,462 B1
(45) Date of Patent: May 8, 2001

(54) WIDE ANGLE, ATOMIZING-TYPE OF CLEANING DEVICE FOR WINDSHIELD OF CAR

(76) Inventor: Chih-Ming Chen, P.O. Box 82-144, Taipei (TW)

( * ) Notice: Subject to any disclaimer, the term of this patent is extended or adjusted under 35 U.S.C. 154(b) by 0 days.

(21) Appl. No.: 09/589,738

(22) Filed: Jun. 9, 2000

(51) Int. Cl.[7] .................................................. B05B 1/10
(52) U.S. Cl. ...................................... 239/284.1; 239/135
(58) Field of Search ................................ 239/284.1, 75, 239/135

(56) References Cited

U.S. PATENT DOCUMENTS

| | | | |
|---|---|---|---|
| 3,352,353 | * | 11/1967 | Stevens et al. ................... 239/284.1 |
| 3,632,042 | * | 1/1972 | Goulish et al. ................ 239/284.1 X |
| 3,888,412 | * | 6/1975 | Lindo ............................. 239/284.1 X |
| 4,090,668 | * | 5/1978 | Kochenour ..................... 239/284.1 X |
| 5,118,040 | * | 6/1992 | Abe .................................... 239/284.1 |
| 5,354,965 | * | 10/1994 | Lee ................................ 239/284.1 X |
| 5,509,606 | * | 4/1996 | Breithaupt et al. ............ 239/284.1 X |
| 6,029,908 | * | 2/2000 | Petzold ........................... 239/284.1 X |

* cited by examiner

Primary Examiner—Lesley D. Morris
(74) Attorney, Agent, or Firm—A & J

(57) ABSTRACT

A wide angle, atomizing-type of cleaning device for windshield of car is disclosed. The cleaning solution storage tank is heated by the energy of the engine of the car and by means of a liquid pump and an air pump, together with nozzles, the cleaning solution is atomized to clean the windshield by rapidly dissolving the oil mist and moisture. The wiper faces little resistance from the surface of the windshield as the entire surface is provided with the atomized cleaning solution from the tank.

3 Claims, 4 Drawing Sheets

WIDE ANGLE, ATOMIZING-TYPE OF CLEANING DEVICE FOR WINDSHIELD OF CAR

BACKGROUND OF THE INVENTION (a) Technical Field of the Invention

The present invention relates to a cleaning device, and in particular, to a cleaning device with heater to produce a wide angle atomized solution for the cleaning windshield of a car.

(b) Description of the Prior Art

Conventional car wipers employ a liquid pump to deliver a cleaning solution from a cleaning solution storage tank via a single or dual-holes nozzle so as to provide a single or dual water stream for cleaning the windshield of the vehicle. Such structure has the following drawbacks:

(1) The stream thus produced is always at a fixed point on the windshield, which causes the accumulation of the cleaning solution at a specified point or loss of cleaning solution prior to cleaning the windshield.

(2) As the stream produced is at a fixed point on the windshield, most regions on the windshield are still dry, and therefore the wipers clean the windshield without cleaning solution. Thus the dust particles may not rapidly wipe off and the wipers face a strong resistance while cleaning. The wipers will be eventually damaged.

(3) The holes of the nozzle can easily be blocked, in particular, during the process of waxing the vehicle, and besides, effective cleaning of the blocked holes of the nozzle is not easy.

In cold weather countries, the cleaning of windshield with heat is an effective method to clear away the accumulated snow or mist on the windshield, but in most cases, the heating is achieved by employing the power of the vehicle to heat the cleaning solution and is then ejected as stream by the solution pump. However, the method of using cleaning solution with heat and then employing atomized hot mist so as to rapidly dissolve dust particles, oily mist or freezing moisture has not been seen. Therefore, it is an object of the present invention to provide a cleaning device for windshield of a vehicle.

SUMMARY OF THE INVENTION

Accordingly, an aspect of the present invention is to provide a wide angle, atomizing-type of cleaning device for windshield of a car comprising a temperature-controlled valve, a cleaning solution storage tank, a temperature controller, a heat sink, an air pump, a liquid pump and nozzles, characterized in that the heat sink is located within the storage tank and has a simple cavity structure having an inlet and outlet, and heat energy of the heat sink is obtained from the heat energy of the cooling recycle water used to cool the engine during the engine operation, the temperature controller provided to the tank is used to detect the temperature of the cleaning solution so as to control the temperature-controlled valve to allow the flowing of the cooling water recycle of the engine, a check valve at the outlet of the storage tank is connected to the liquid pump via a conduit, and the activation of the liquid pump to transport the liquid for pressurization also activates the air pump to produce atomized solution ejected from the nozzles comprising a nozzle body, a universal ejector, fastening device and conduits, wherein the bottom section of the nozzle body is provided with a hollow threaded solution tube and an air valve which are fastened to the hood of the car, at the front of the windshield, the thread solution tube and the air tube are respectively connected to the solution pump conduit and the air pump conduit, and the universal ejector is adapted to a circular recess of the ejector body, and the front end of the ejector body is a narrow slit, and the rear and is a universal bead body, and the bead body is provided with a hollow aperture.

Yet another object of the present invention is to provide a wide angle, atomizing-type of cleaning device for windshield of a car, wherein the temperature controller is adjustable to comply with the environmental climate of various regions.

In accordance with other aspect of the present invention, other advantages of the cleaning device are as follows:

(1) The device has an instantaneous, wide-angle atomization capability.

(2) The atomized solution produced covers a wide surface such that the entire windshield is wet with atomized cleansing solution, facilitating the cleaning process by the wipers. Besides, it effectively reduces the resistance of the windshield against the wipers while cleaning.

(3) The cleaning solution for atomization and heating treatment can effectively dissolve the oily mist and effectively remove fog adhered on the windshield. In addition, it enhances the cleaning capability of the wipers in freezing environment.

(4) The heat-releasing source of the heat sink is obtained from the recycle of cooling water in the engine, and thus, no addition installation of heat supply is required.

(5) The heat treatment of the cleaning device is detected by a temperature controller which is capable of automatically switching ON/OFF in the cleaning process.

(6) The atomized solution in the present cleaning device is supplied by means of an air pump and a liquid pump.

(7) The nozzle can provide a wide-angle ejection of the cleaning solution and has a universal bead body to allow all direction adjustment of the nozzle.

Other objects and advantages of the present invention will become more apparent from the following description taken in conjunction with the accompanying drawing.

DETAILED DESCRIPTION OF THE PREFERRED EMBODIMENT

Figure 1:
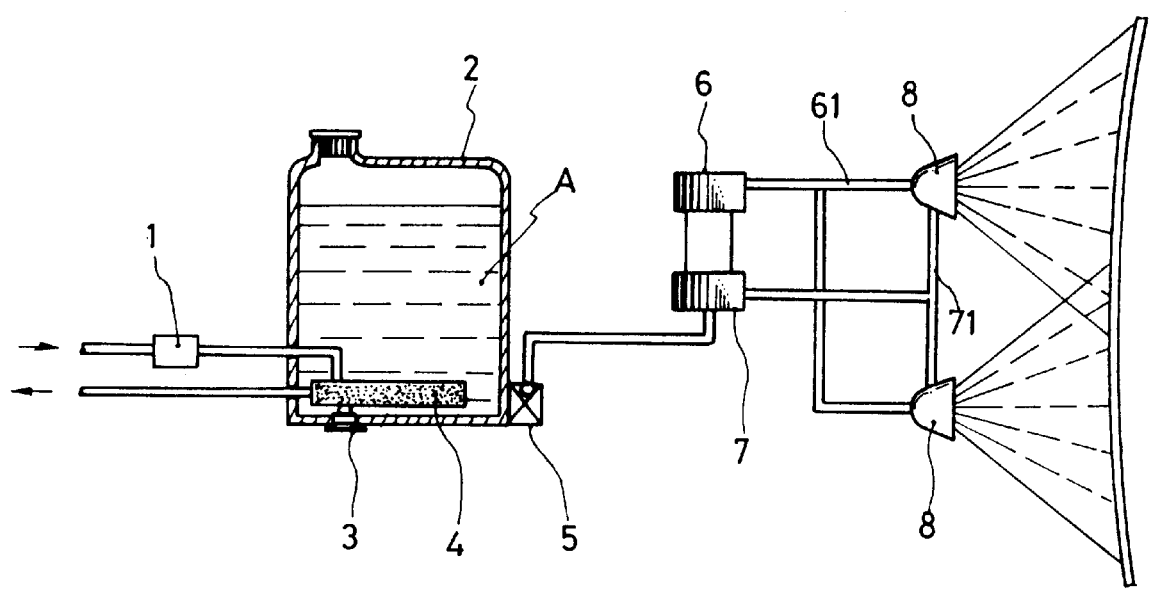
FIG. 1 is a schematic view showing the entire structure of the wide angle, atomizing-type of cleaning device for windshield or the like of the present invention.

Referring to FIG. 1, there is shown the entire structure of the cleaning device comprising a temperature-controlled valve 1, a storage tank 2 for cleaning solution, a temperature controller 3, a heat sink 4, a check valve 5, an air pump 6, a solution pump 7 and nozzles 8.

In accordance with the present invention, the heat sink 4 is located within the storage tank 2 and has a simple structure which is a cavity body with an inlet and outlet. The heat energy is obtained from the cooling re-cycle water used to cool the engine during the operation of the engine so that the heat sink 4 can obtain heat energy and dissipate the heat energy. The temperature controller 3 provided to the tank 2 is used to detect the temperature of the cleansing solution A and in turn to control the temperature-controlled valve 1 so as to switch to operate the cooling water recycle of the engine. At the same time, the temperature controller 3 is adjustable to suit the climate of the environment so as to provide automatic operation capability.

The cleaning solution A in the tank 2 is controlled by the check valve 5 and it is pressurized via the solution pump 7 and ejected by the nozzles 8. At the same time, the air pump 6 delivers a high pressurized air such that the instantaneous ejected solution A atomizes. The check valve 5 at the outlet of the storage tank 2 prevents the solution A from flowing backward to the tank 2. Thus, the atomization of the solution A will not be delayed but will continue once it is initiated.

Figure 2:
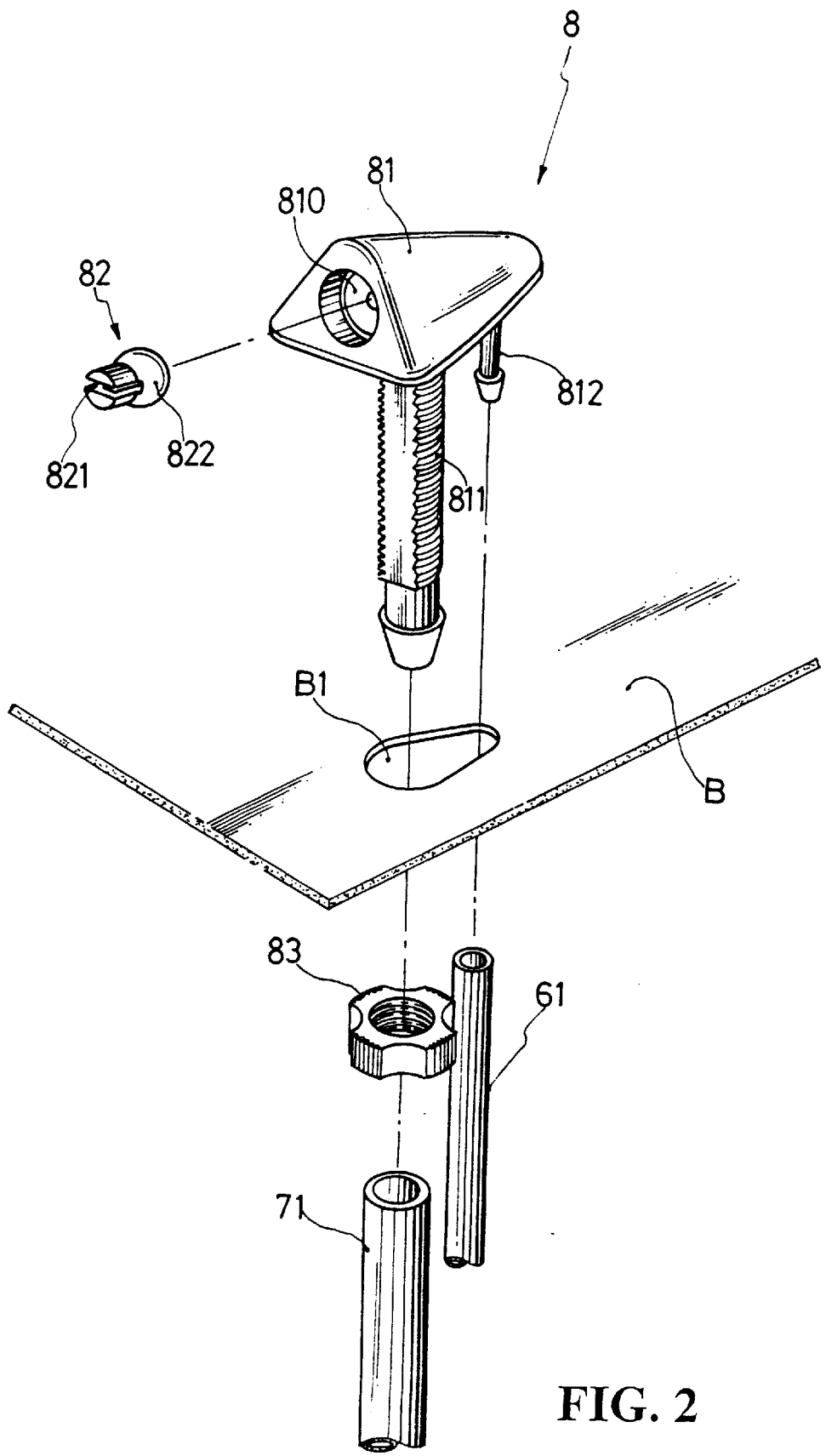
FIG. 2 is a perspective exploded view of the nozzles in accordance with the present invention.

As shown in FIG. 2, the nozzle 8 located at the hood, close to the bottom edge of the windshield comprises a nozzle body 81, a universal ejector 82 and a fastening device 83 together with conduits 71, 61. At the bottom section of the nozzle body 81 a hollow threaded solution tube 811 and an air tube 812 are provided. The threaded solution tube 811 and the air tube 812 are mounted to an aperture B1 on the hood B and the fastening device 83 is used to fasten the threaded solution tube 811, and the entire nozzle body 81 is then mounted at the hood B. The threaded solution tube 811 and the air tube 812 are respectively connected to a solution pump conduit 71 and an air pump conduit 61.

Figure 3:
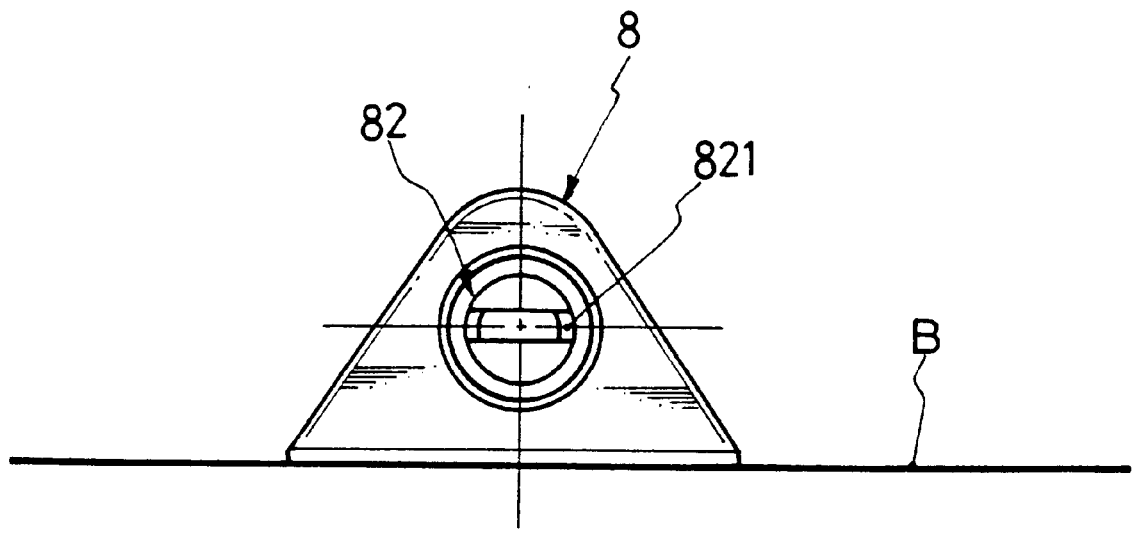
FIG. 3 is a front view of the nozzles of the present invention.
Figure 4:
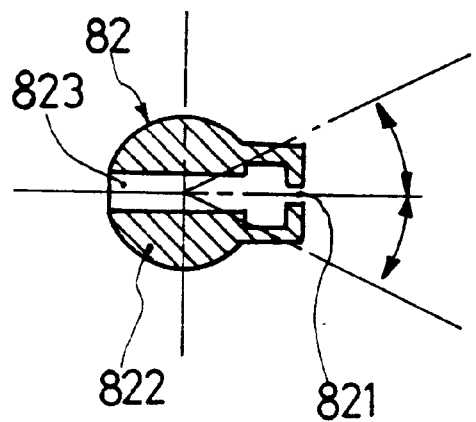
FIG. 4 is a sectional view of the universal ejector of the nozzle in accordance with the present invention.

Referring to FIGS. 3 and 4, the ejection angle of the atomized solution is controlled by the universal ejector 82 having an ejection narrow slit 821 at the front end thereof and a universal bead body 822 at the rear thereof. A hollow aperture 823 is provided to the bead body 822 and allows the ejection of the solution and air, and the universal bead body 822 is adapted into the circular recess 810 such that it can move in all direction within the recess 810. The ejection slit 821 allows a wide angle ejection of the atomized solution so that a wide angle atomization with heat cleaning of windshield is provided.

Figure 5:
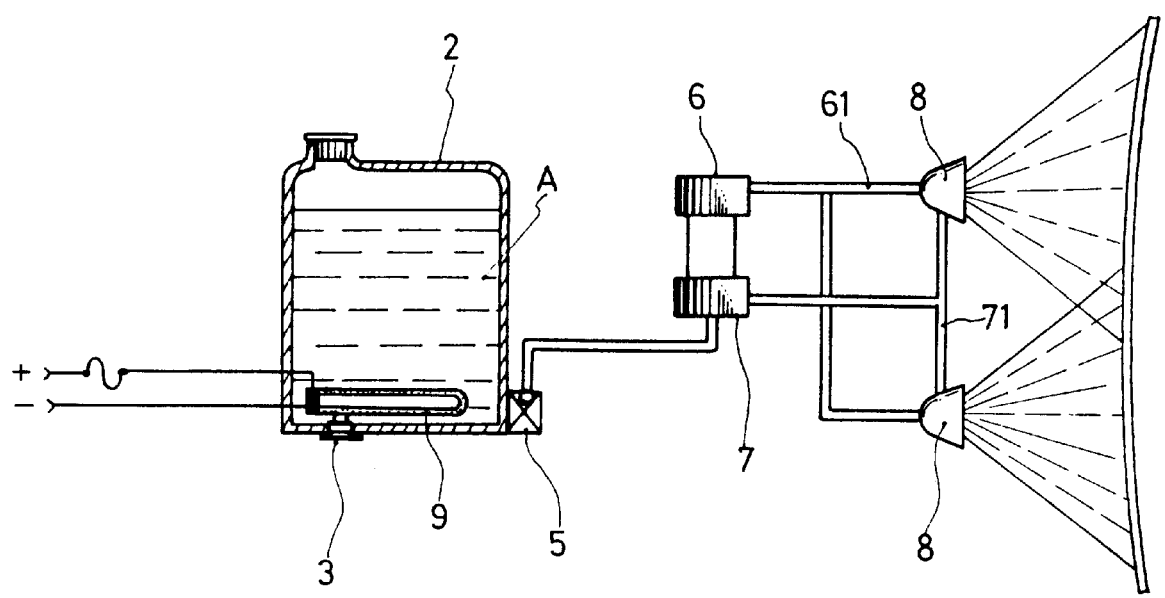
FIG. 5 is a schematic view showing the entire structure of another preferred embodiment of the present invention.

Referring to FIG. 5, there is shown another preferred embodiment in accordance with the present invention. The heat sink 4 can be replaced by a heater 9. The heat energy is supplied by the electrical power supply of the car and at the same time, by means of the temperature controller 3, a constant temperature heating and wide angle atomized cleaning of windshield or windows is obtained.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A wide angle, atomizing-type of cleaning device for windshield of a car comprising a temperature-controlled valve, a cleaning solution storage tank, a temperature controller, a heat sink, an air pump, a liquid pump and nozzles, characterized in that the heat sink is located within the storage tank and has a simple cavity structure having an inlet and outlet, and heat energy of the heat sink is obtained from heat energy of recycled engine coolant during engine operation, the temperature controller provided to the tank is used to detect the temperature of the cleaning solution so as to control the temperature-controlled valve to allow flow of such recycled engine coolant, a check valve at the outlet of the storage tank is connected to the liquid pump via a conduit, and the activation of the liquid pump to transport the liquid for pressurization also activates the air pump to produce atomized solution ejected from the nozzles comprising a nozzle body, a universal ejector, fastening device and conduits, wherein the bottom section of the nozzle body is provided with a hollow threaded solution tube and an air valve which are fastened to the hood of the car, at the front of the windshield, the threaded solution tube and the air tube are respectively connected to solution pump conduit and air pump conduit, and the universal ejector is adapted to a circular recess of an ejector body, and the front end of the ejector body is a narrow slit, and the rear and is a universal bead body, and the bead body is provided with a hollow aperture.

2. The wide angle, atomizing-type of cleaning device as set forth in claim 1, wherein the temperature controller is adjustable to comply with the climate of various regions.

3. A wide angle, atomizing-type of cleaning device for windshield of a car comprising a temperature-controlled valve, a cleaning solution storage tank, a temperature controller, a heater, an air pump, a liquid pump and nozzles, characterized in that the heater is located within the storage tank and has a simple cavity structure having an inlet and outlet, and heat energy of the heater is obtained from heat energy of recycled engine coolant during engine operation, the temperature controller provided to the tank is used to detect the temperature of the cleaning solution so as to control the temperature-controlled valve to allow flow of such recycled engine coolant, a check valve at the outlet of the storage tank is connected to the liquid pump via a conduit, and the activation of the liquid pump to transport the liquid for pressurization also activates the air pump to produce atomized solution ejected from the nozzles comprising a nozzle body, a universal ejector, fastening device and conduits, wherein the bottom section of the nozzle body is provided with a hollow threaded solution tube and an air valve which are fastened to the hood of the car, at the front of the windshield, the threaded solution tube and the air tube are respectively connected to solution pump conduit and air pump conduit, and the universal ejector is adapted to a circular recess of an ejector body, and the front end of the ejector body is a narrow slit, and the rear and is a universal bead body, and the bead body is provided with a hollow aperture.

* * * * *